(12) United States Patent
Schneider et al.

(10) Patent No.: US 10,296,451 B1
(45) Date of Patent: May 21, 2019

(54) CONTENT ADDRESSABLE STORAGE SYSTEM UTILIZING CONTENT-BASED AND ADDRESS-BASED MAPPINGS

(71) Applicant: EMC IP Holding Company LLC, Hopkinton, MA (US)

(72) Inventors: Zvi Schneider, Tel Aviv (IL); Amitai Alkalay, Kadima (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/177,890

(22) Filed: Nov. 1, 2018

(51) Int. Cl.
*G06F 3/06* (2006.01)
*G06F 12/02* (2006.01)

(52) U.S. Cl.
CPC .......... *G06F 12/023* (2013.01); *G06F 3/0604* (2013.01); *G06F 3/0655* (2013.01); *G06F 3/0689* (2013.01); *G06F 2212/70* (2013.01)

(58) Field of Classification Search
CPC ........ G06F 12/023; G06F 3/06; G06F 3/0667; G06F 3/0604; G06F 3/0619; G06F 3/0641; G06F 3/0608; G06F 3/0655; G06F 3/0689; G06F 2212/70; G06F 3/0613; G06F 3/067; G06F 3/065; G06F 12/0866; G06F 12/00; G06F 3/0661; G06F 12/08
USPC ........................................................ 711/154
See application file for complete search history.

(56) References Cited

U.S. PATENT DOCUMENTS

| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,966,191 | B2* | 2/2015 | Flynn ...................... G06F 3/061 711/154 |
| 9,104,326 | B2 | 8/2015 | Frank et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mano Padmanabhan
*Assistant Examiner* — Jean C Edouard
(74) *Attorney, Agent, or Firm* — Ryan, Mason & Lewis, LLP

(57) ABSTRACT

A storage system in one embodiment comprises a plurality of storage devices and a storage controller. The storage controller is configured to receive a plurality of logical addresses. Each logical address has one of a content-based mapping type and an address-based mapping type. Responsive to a first logical address of the plurality of logical addresses having the content-based mapping type, the storage controller is configured to utilize a content-based mapping generated based on content of a data page associated with the first logical address to identify a corresponding physical address. Responsive to a second logical address of the plurality of logical addresses having the address-based mapping type, the storage controller is configured to utilize an address-based mapping generated based on the second logical address to identify a corresponding physical address.

20 Claims, 8 Drawing Sheets

(56) References Cited

U.S. PATENT DOCUMENTS

| | | |
|---|---|---|
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |
| 9,606,914 B2* | 3/2017 | Thatcher ............... G06F 3/0604 |
| 9,716,754 B2 | 7/2017 | Swift |
| 2007/0288718 A1* | 12/2007 | Cholleti ............. G06F 12/0223 711/170 |
| 2007/0288720 A1* | 12/2007 | Cholleti ............... G06F 9/5016 711/202 |
| 2008/0279462 A1 | 11/2008 | Celi, Jr. |
| 2009/0132955 A1 | 5/2009 | Garg et al. |
| 2010/0031000 A1* | 2/2010 | Flynn ................. G06F 16/9014 711/216 |
| 2010/0179941 A1 | 7/2010 | Agrawal et al. |
| 2011/0060887 A1* | 3/2011 | Thatcher ............... G06F 3/0604 711/171 |
| 2011/0307659 A1* | 12/2011 | Hans ..................... G06F 3/0613 711/114 |
| 2012/0124282 A1* | 5/2012 | Frank ..................... G06F 3/061 711/108 |
| 2013/0305002 A1* | 11/2013 | Hallak ................... G06F 3/061 711/162 |
| 2013/0325824 A1 | 12/2013 | Shoens |
| 2014/0181016 A1 | 6/2014 | Whitehead et al. |
| 2014/0281307 A1* | 9/2014 | Peterson ................. G06F 3/065 711/162 |
| 2014/0310476 A1* | 10/2014 | Kruus ................ G06F 12/0871 711/133 |
| 2015/0356024 A1* | 12/2015 | Loh .................... G06F 12/1054 711/113 |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2017/0192857 A1 | 7/2017 | Meiri et al. |
| 2017/0323110 A1* | 11/2017 | Griffith ............... G06F 21/6218 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

CONTENT ADDRESSABLE STORAGE SYSTEM UTILIZING CONTENT-BASED AND ADDRESS-BASED MAPPINGS

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, some inefficiencies may arise in cases where the data is not easily deduplicated.

SUMMARY

Illustrative embodiments provide storage systems that are configured for utilizing both content-based and address-based mapping between logical addresses and physical addresses.

In an illustrative embodiment, an apparatus is disclosed. The apparatus comprises a storage system including a plurality of storage devices and a storage controller. The storage controller is configured to receive a plurality of logical addresses. Each logical address has one of a content-based mapping type and an address-based mapping type. Responsive to a first logical address of the plurality of logical addresses having the content-based mapping type, the storage controller is configured to utilize a content-based mapping generated based on content of a data page associated with the first logical address to identify a corresponding physical address. Responsive to a second logical address of the plurality of logical addresses having the address-based mapping type, the storage controller is configured to utilize an address-based mapping generated based on the second logical address to identify a corresponding physical address. The storage controller is implemented by at least one processing device comprising a processor coupled to a memory.

In some embodiments, the storage controller may be further configured to determine the mapping type of each logical address based at least in part on information contained in a metadata structure associated with the plurality of logical addresses. The information contained in the metadata structure may comprise a flag corresponding to each logical address. The flag corresponding to a given logical address may indicate whether the given logical address has the content-based mapping type or the address-based mapping type.

In illustrative embodiments, the information contained in the metadata structure comprises an entry for each logical address where each entry comprises a hash value associated with the corresponding logical address.

In another illustrative embodiment, the hash value for an entry corresponding to a given logical address having the content-based mapping type comprises a content-based signature generated based on content of a data page associated with the given logical address.

In some embodiments, the hash value for an entry corresponding to a given logical address having the address-based mapping type comprises a hash of the given logical address.

In additional embodiments, data pages associated with logical addresses having the address-based mapping type are not deduplicated by the storage system.

In illustrative embodiments, the mapping generated based on the second logical address comprises a mapping to a range of physical addresses where the range of physical addresses comprising the physical address corresponds to the second logical address. The second logical address may comprise a base logical address in a range of logical addresses having the address-based mapping type. The storage controller may be further configured to identify an offset of a given logical address in the range of logical addresses relative to the base logical address and to utilize the identified physical address corresponding to the second physical address as a base physical address in the range of physical addresses. The storage controller may be further configured to identify a physical address corresponding to the given logical address from the range of physical addresses using the identified offset as an offset relative to the base physical address.

In some embodiments, the range of physical addresses may comprise a redundant array of independent disks (RAID) stripe distributed across the plurality of storage devices.

In yet another embodiment, the plurality of storage devices may be configured to store data corresponding to logical addresses having the address-based mapping type in a first volume and to store data corresponding to logical addresses having the content-based mapping type in a second volume different than the first volume.

In an embodiment, the plurality of storage devices may be configured to store data corresponding to logical addresses having the address-based mapping type and data corresponding to logical addresses having the content-based mapping type together in the same volume.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
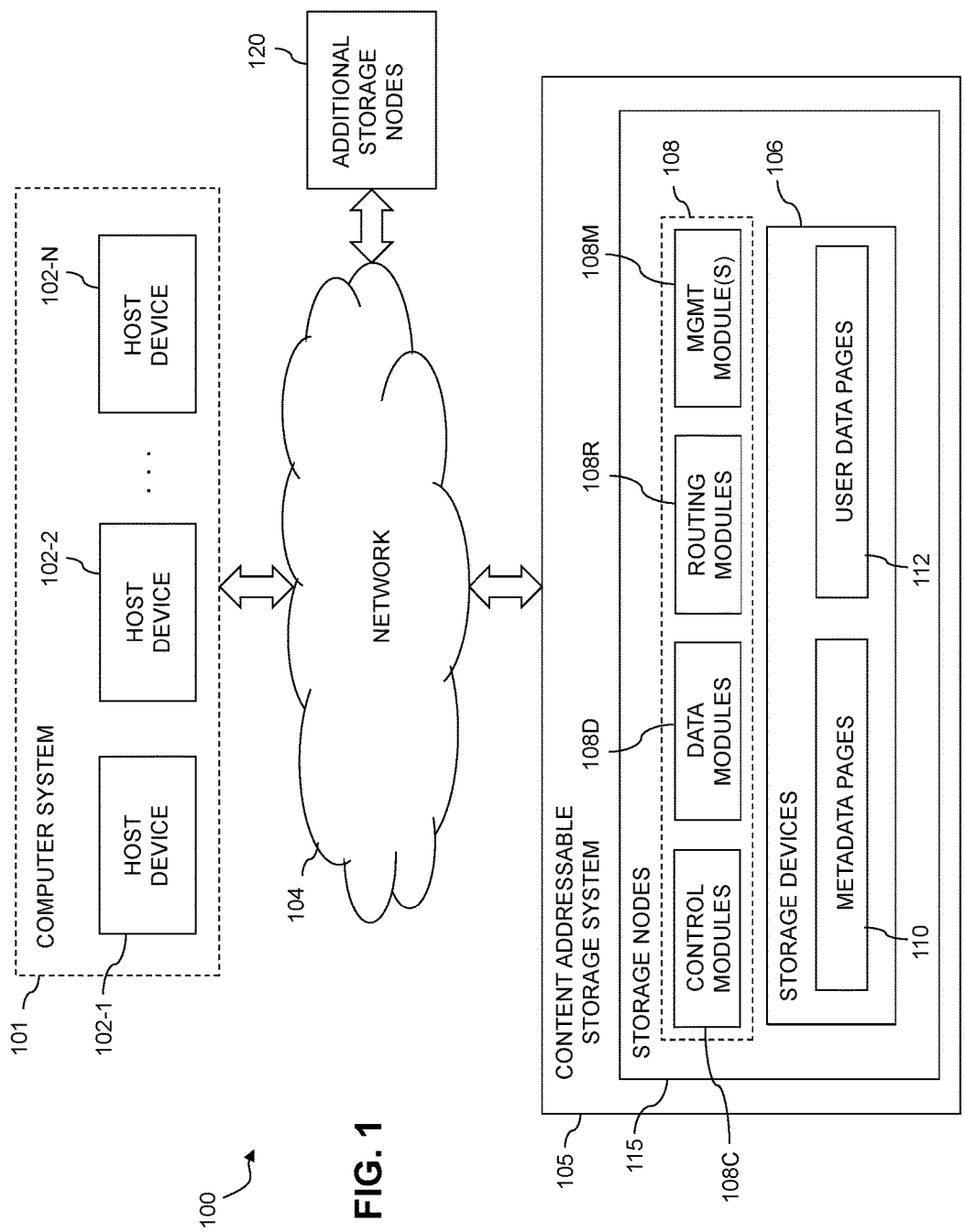
FIG. 1 is a block diagram of an information processing system comprising a content addressable storage system configured for utilizing both content-based and address-based mapping between logical addresses and physical addresses in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments. In illustrative embodiments, the content addressable storage system 105 utilizes both content-based mapping and address-based mapping of logical addresses to physical addresses.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

In some embodiments, the storage devices 106 may implement at least one redundant array of independent disks (RAID) 6 arrangement involving multiple ones of the storage devices 106. Additional or alternative RAID or non-RAID arrangements can be used to store data in the storage system 105.

The RAID 6 arrangement in this embodiment illustratively includes an array of different "disks," each a different physical storage device of the storage devices 106. Multiple such physical storage devices are typically utilized to store data of a given LUN or other logical storage volume in the storage system 105. For example, data pages or other data blocks of a given LUN or other logical storage volume can be "striped" along with its corresponding parity information across multiple ones of the disks in the RAID 6 arrangement.

A given RAID 6 arrangement in an illustrative embodiment defines block-level striping with double distributed parity and provides fault tolerance of two drive failures, so that the array continues to operate with up to two failed drives, irrespective of which two drives fail. In the RAID 6 arrangement, data blocks and corresponding p-type and q-type parity information are arranged in a row or stripe. Other data and parity blocks in the RAID 6 arrangement are distributed over the disks in a similar manner, collectively providing a diagonal-based configuration for the p-type and q-type parity information. Other types of RAID implementations can be used, as will be appreciated by those skilled in the art, possibly using error correcting codes in place of parity information.

Additional details regarding exemplary techniques for storing data in RAID arrays such as a RAID 6 arrangement are disclosed in U.S. Pat. No. 9,552,258, entitled "Method and System for Storing Data in RAID Memory Devices," which is incorporated by reference herein.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate address mapping logic as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to control the implementation of functionality for utilizing both content-based and address-based mapping between logical addresses and physical addresses as disclosed herein. The distributed storage controller 108 is assumed to comprise a type of "processing device" as that term is broadly used herein, and more particularly comprises at least one processor coupled to a memory.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112.

In illustrative embodiments, the content addressable storage system 105 is also configured to generate hash metadata providing a mapping between logical addresses and corresponding physical locations in the user data area that are not content-based. For example, the hash metadata may be based on hashes of the logical block addresses themselves.

The hash metadata generated by the content addressable storage system 105, whether content-based or address-based, is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a hash value. The hash value is either a content-based signature generated as a hash function of content of the corresponding user data page or an address-based hash of a logical address. Illustrative hash functions that may be used to generate the content-based signature or address-based hash include the SHA1 hash function, where SHA denotes Secure Hashing Algorithm, or other secure hashing algorithms known to those skilled in the art, including SHA2, SHA256 and many others. The content-based signatures and address-based hashes are utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and hash values for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for utilizing content-based and address-based mapping of logical addresses to physical addresses in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include mapping logic that engages or otherwise interacts with corresponding control logic instances in at least a subset of the control modules 108C, data modules 108D and routing modules 108R in order to implement content-based and address-based mapping of logical addresses to physical addresses.

In some embodiments, the content addressable storage system 105 comprises an XtremIO™ storage array suitably modified to incorporate techniques for utilizing content-based and address-based mapping of logical addresses to physical addresses as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for utilizing content-based and address-based mapping of logical addresses to physical addresses in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical addresses. The first level of mapping uses an address-to-hash ("A2H") table and the second level of mapping uses a hash metadata ("HMD") table, with the A2H and HMD tables corresponding to respective logical and physical layers of the content-based and address-based signature mapping within the content addressable storage system 105. The HMD table or a given portion thereof in some embodiments disclosed herein is more particularly referred to as a hash-to-data ("H2D") table.

Figure 3A:
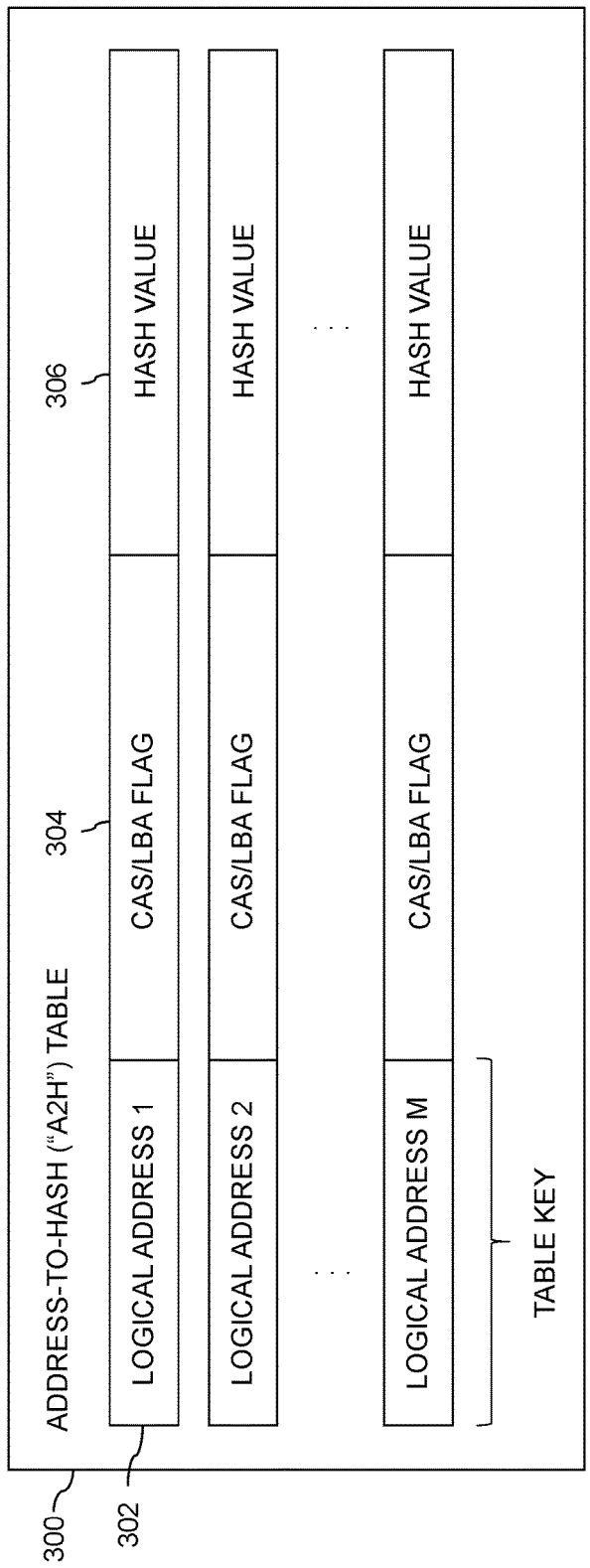
FIGS. 3A and 3B show examples of internal hash metadata structures in an illustrative embodiment.

The first level of mapping using the A2H table associates logical addresses with respective hash values. For example, content-based mapping may associate logical addresses of respective data pages with respective content-based signatures of those data pages. Address-based mapping may associate logical addresses with respective hashes of those logical addresses. This is also referred to as logical layer mapping. An example of an A2H table according to an embodiment of the present disclosure is illustrated in FIG. 3A. As seen in FIG. 3A, for example, each entry in the A2H table 300 includes a logical block address 302, a CAS/LBA flag 304 (where CAS stands for content addressable storage and LBA stands for logical block address), and the hash value 306, e.g., a content-based signature or hash handle or a hash of the logical block address 302. In some embodiments, the logical block address 302 may be used as a key for accessing the entries in the table.

In illustrative embodiments, the CAS/LBA flag 304 may be utilized by content addressable storage system 105 to indicate whether a particular logical block address 302 has a content-based mapping type or an address-based mapping type. For example, the CAS/LBA flag 304 may be a binary flag such that, e.g., a value of 1 may indicate that the corresponding logical address has a content-based mapping type and a value of 0 may indicate that the corresponding logical address has the address-based mapping type. Any other values or mechanisms may be used to indicate the type of the mapping.

As described above, a content-based mapping of logical block addresses to physical addresses provides many benefits including more efficient deduplication, storage space savings, and other similar benefits. However, in some cases where the underlying data is not easily deduplicated, such as, e.g., encrypted data, a large amount of memory may be used in mapping the logical addresses to the physical addresses using content-based mapping, potentially resulting in a reduction in the total available addressable space and reduced access speeds. Illustrative embodiments utilize mapping tables that include both content-based mapping for logical block addresses for which the associated data can be deduplicated and address-based mapping for logical block addresses for which the associated data is not easily deduplicated.

Figure 3B:
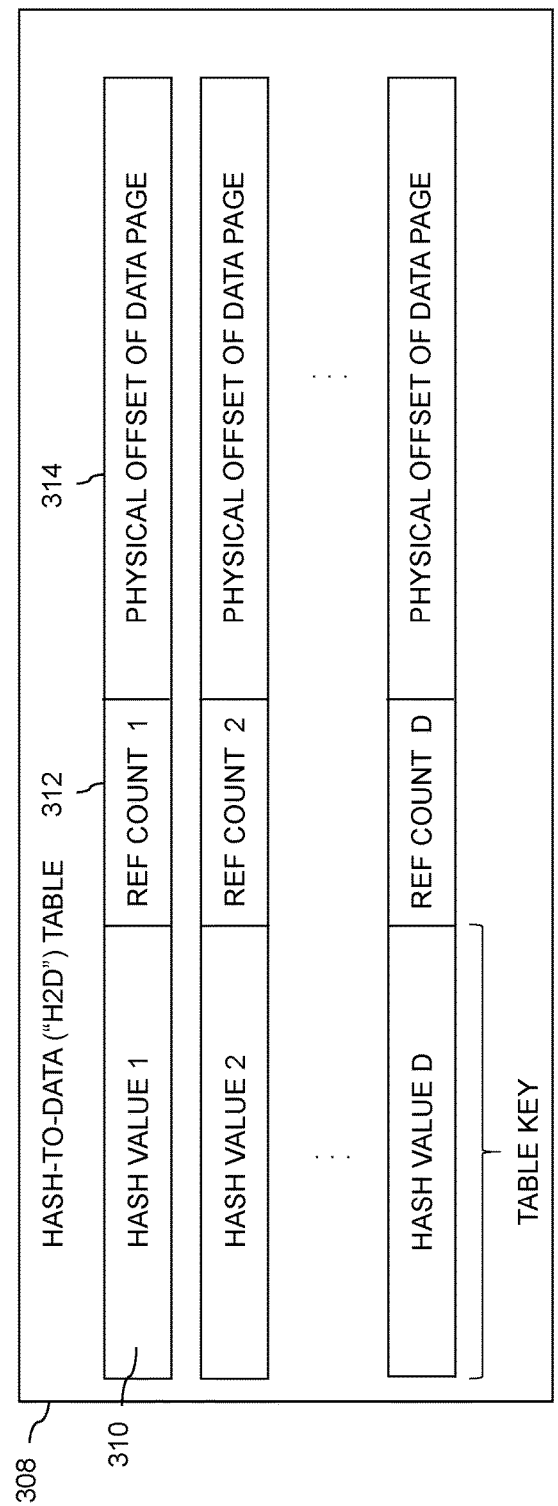

The second level of mapping using the HMD table, illustrated in FIG. 3B as a H2D table 308, associates respective ones of the hash values with respective physical storage locations in one or more of the storage devices 106. This is also referred to as physical layer mapping. For example, as illustrated in FIG. 3B, an entry in the H2D table 308 may include a hash value 310, a reference count 312, and a physical offset for the data page 314. In some embodiments, the hash value 310 may be used as a key for accessing the entries in the H2D table.

In illustrative embodiments, for example, the hash value 310 may be a hash handle or other content-based signature generated based on a data page associated with a logical block address having the content-based mapping type or may be a hash of the logical block address itself for logical block addresses having the address-based mapping type.

For a given write request, both of the corresponding H2D and A2H tables are updated in conjunction with the processing of that write request.

The A2H and H2D tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, and HMD tables, and their respective configurations, should be considered non-limiting and are presented by way of illustrative example only.

The logical block addresses or LBAs of a logical layer of the content addressable storage system 105 correspond to respective physical blocks of a physical layer of the content addressable storage system 105. The user data pages of the logical layer are organized by LBA and have reference via respective hash values 306/310 to particular physical blocks of the physical layer using the A2H and HMD tables.

Each of the physical blocks has an associated reference count, e.g., a reference count 312, that is maintained within the content addressable storage system 105, e.g., within the H2D table. The reference count for a given physical block indicates the number of logical blocks that point to that same physical block, e.g., the block found at the corresponding physical offset 314 in the H2D table.

In some embodiments, logical block addresses having the address-based mapping type may be mapped via the A2H and H2D tables to a region or range of physical addresses. For example, a single logical block address having the address-based mapping type may map to an entire stripe in a RAID 6 array or any other range of physical addresses. In some embodiments, the single logical block address may correspond to a first logical block address in a range of logical block addresses and may map to a first physical address in a range of physical addresses. In such an embodiment, data corresponding to a particular logical block address in the range of logical block addresses may be accessed by utilizing the entry corresponding to the first logical block address in the range of logical block addresses in the A2H table and the corresponding entry in the H2D table to identify the first physical address in range of physical addresses. For example, the offset of the particular logical block address relative to the first logical block address may be used as the offset of the corresponding physical address relative to the first physical address. In this manner fewer entries are needed in the A2H and H2D tables to provide access to the physical addresses for non-deduplicatable data. For example, by mapping a range of logical block addresses having the address-based mapping type to a range of physical addresses based on a single entry in each of the A2H and H2D tables, the size of the A2H and H2D tables may be reduced which allows more storage space to be available as usable data storage.

As an example, for a region or range of logical block addresses having a size of 2 MB, the A2H table may include an entry only for the first logical block address, e.g., addr1, of that region with a corresponding hash value generated based on the first logical block address, e.g., hashed(addr1). The H2D table may then map the hash value generated based on the first logical address, e.g., hashed(addr1), to a corresponding physical address which represents a first physical address in a region or range of physical addresses allocated for the region or range of logical addresses, e.g., physical location(hashed(addr1). If an IO operation reads from a logical block address addr1+N, then the data will be read from physical location physical location(hashed(addr1))+N, where N is used as the offset for both the logical address range and the physical address range.

In some embodiments, for example, the A2H table 300 may include the same hash value 306 for more than one logical block address having the address-based mapping type where, for example, the same hash value 306 may be used for every logical block address in a range of logical block addresses having the address-based mapping type.

In some embodiments, entries in the A2H table including logical block addresses having the address-based mapping type may alternatively include a pointer directly to the corresponding physical address instead of the hash value that is mapped separately to the physical address via the H2D table. For example, in such an embodiment, the H2D table may be circumvented entirely for those logical block addresses having the address-based mapping type, thereby reducing the memory required for the H2D table.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for utilizing both content-based and address-based mapping between logical addresses and physical addresses in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for utilizing both content-based and address-based mapping between logical addresses and physical addresses as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
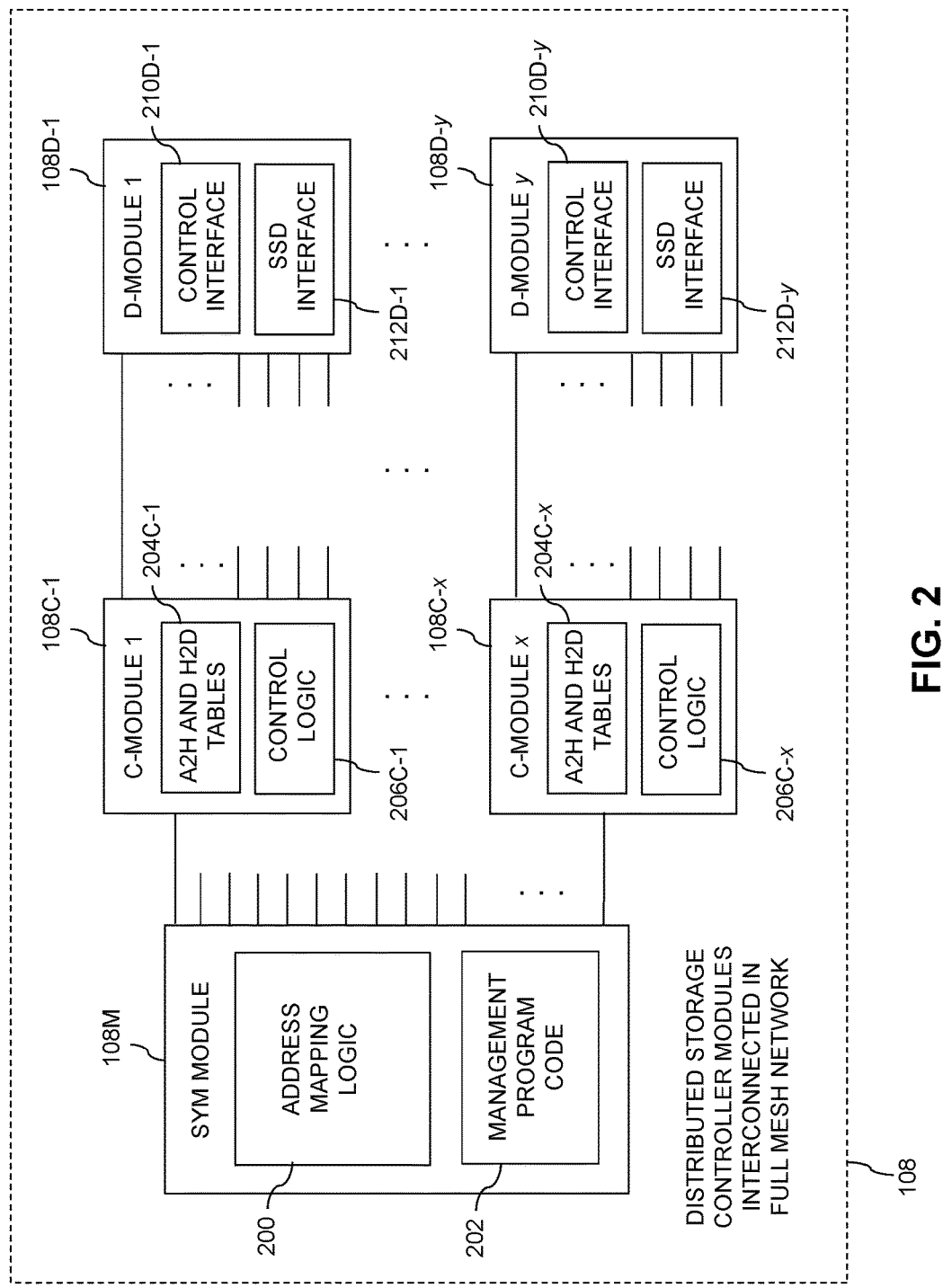
FIG. 2 illustrates a portion of a distributed storage controller of a content addressable storage system showing one possible arrangement utilizing control modules and data modules interconnected by a mesh network and configured for utilizing both content-based and address-based mapping between logical addresses and physical addresses in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises address mapping logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based or address-based signatures, as described in further detail elsewhere herein. The control modules 108C-1 through 108C-x further comprise corresponding instances of control logic 206C-1 through 206C-x that interact with the address mapping logic 200 of the management module 108M to support utilizing both content-based and address-based mapping between logical addresses and physical addresses as disclosed herein.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 4:
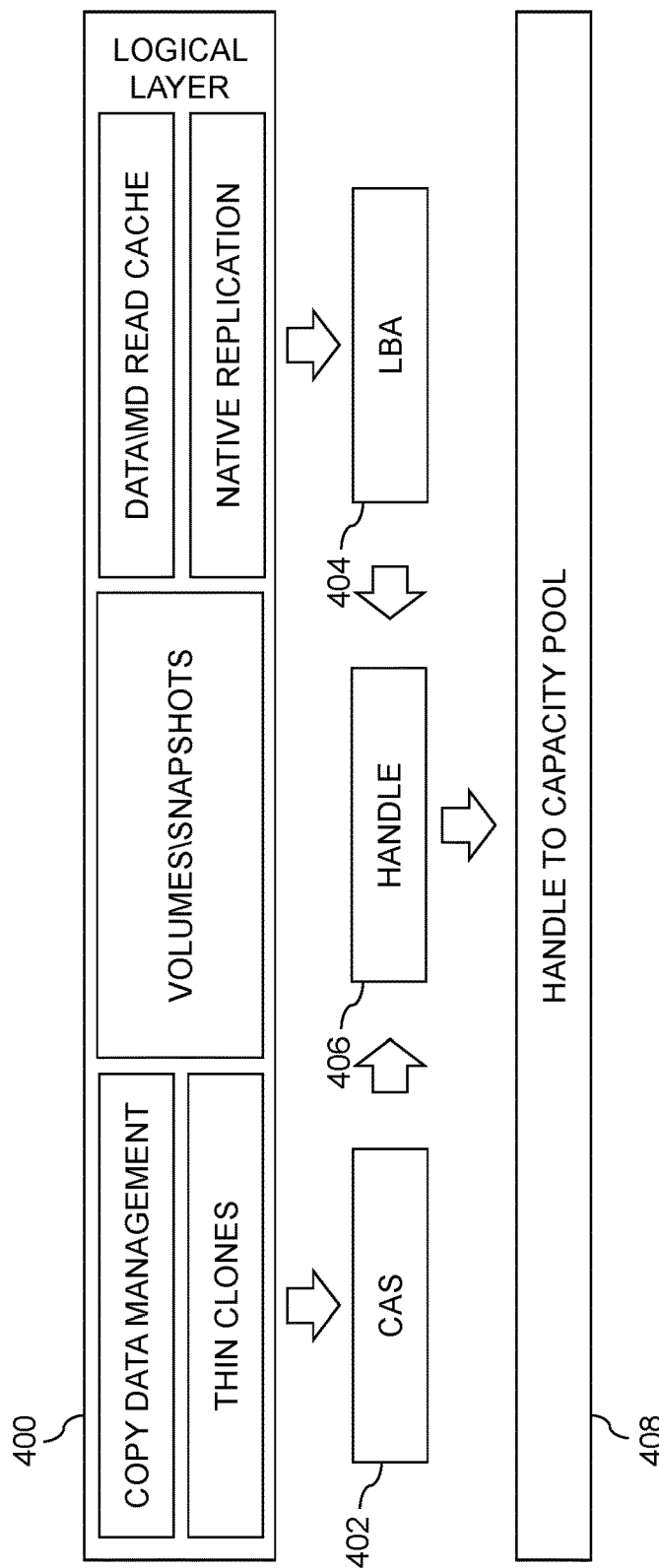
FIG. 4 illustrates a block diagram of an example information processing system in an illustrative embodiment.

An example system diagram utilizing both content-based and address-based mapping between logical addresses and physical addresses is illustrated in FIG. 4. For example, a logical layer 400 may comprise copy data management, thin clones (read-write copies of thin block storage resources such as, e.g., LUNs, consistency groups, virtual machine file system (VMFS) datastores, or other similar thin block storage resource), volumes, snapshots, data and metadata ("data/MD") read cache, native replication or other types of data. The data found in the logical block addresses of the logical layer may be of a content-based mapping type, e.g., CAS 402, or an address-based mapping type, e.g., LBA 404. For example, the logical block addresses of each mapping type may be used as keys for entries in the A2H table with the CAS/LBA flag 304 (FIG. 3A) indicating which type of mapping is being used. Each of the CAS 402 and LBA 404 type entries may correspond to a handle 406, e.g., a hash value 306 as describe above. The handle 406 is mapped to a physical address in the capacity pool 408, for example, using the H2D table as described above.

Figure 5:
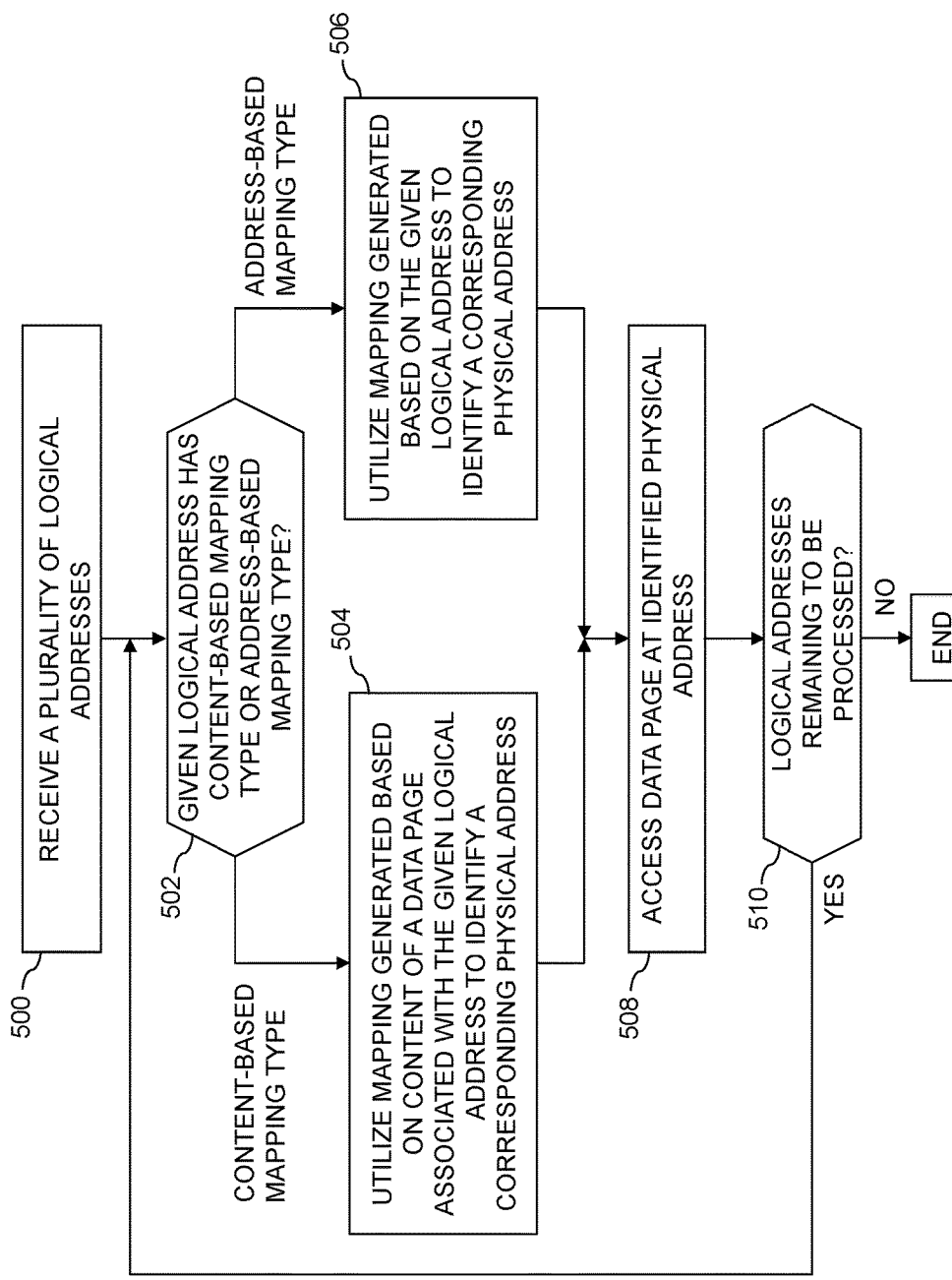
FIG. 5 is a flow diagram showing a process for utilizing both content-based and address-based mapping between logical addresses and physical addresses in an illustrative embodiment.

The operation of the information processing system 100 will now be described in further detail with reference to the flow diagram of FIG. 5. The flow diagram of FIG. 5 illustrates a set of processing operations implementing functionality for utilizing both content-based and address-based mapping between logical addresses and physical addresses in a content addressable storage system. The process includes steps 500 through 510, and is suitable for use in system 100 but is more generally applicable to other types of systems in which it is desirable to utilize both content-based and address-based mapping between logical addresses and physical addresses. The steps of the flow diagram are illustratively performed at least in part under the control of a storage controller of a storage system, such as the distributed storage controller 108 of content addressable storage system 105.

In step 500, a plurality of logical addresses are received by the storage controller 108. For example, a host device may issue one or more IO requests corresponding to data associated with the plurality of logical addresses.

In step 502, the storage controller 108 determines whether a given logical address has a content-based mapping type or an address-based mapping type, for example, using the CAS/LBA flag 304 (FIG. 3A) mentioned above.

In step 504, responsive to the storage controller 108 determining that the given logical address has the content-based mapping type, the storage controller 108 utilizes a mapping generated based on a content of a data page associated with the given logical address to identify a corresponding physical address, for example, as describe above with reference to the A2H and H2D tables.

In step 506, responsive to the storage controller 108 determining that the given logical address has the address-based mapping type, the storage controller 108 utilizes a mapping generated based on the given logical address to identify a corresponding physical address, for example, as describe above with reference to the A2H and H2D tables.

In step 508, storage controller 108 accesses the data page at the identified corresponding physical address to perform an IO operation, e.g., a read or a write, according to the IO request. In step 510, storage controller 108 determines whether or not any of the received logical addresses remain to be processed for the IO request. If there are logical addresses that still need to be processed, the method returns to step 502. If none of the received logical addresses remain to be processed, the method ends as shown.

The particular processing operations and other system functionality described above in conjunction with the flow diagram of FIG. 5 are presented by way of illustrative example only, and should not be construed as limiting the scope of the disclosure in any way. Alternative embodiments can use other types of processing operations for utilizing both content-based and address-based mapping between logical addresses and physical addresses in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 5 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for utilizing both content-based and address-based mapping between logical addresses and physical addresses as disclosed herein can provide a number of significant advantages relative to conventional arrangements.

For example, some embodiments provide content addressable storage systems and other types of clustered storage systems that are configured to utilize both content-based and address-based mapping between logical addresses and physical addresses which may provide more efficient use of storage space for metadata. For example, by using address-based mapping for data that is not easily deduplicated, and in some embodiments having a single logical block address map to a range or region of physical addresses such as an entire RAID stripe, the amount of metadata required in the H2D table for mapping data that is not easily deduplicated may be reduced, thereby increasing the amount of data available for other storage tasks or for the storage of additional data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for utilizing both content-based and address-based mapping between logical addresses and physical addresses will now be described in greater detail with reference to FIGS. 6 and 7. Although described in the context of system 100, these platforms may also be used to implement at least portions of other information processing systems in other embodiments.

Figure 6:
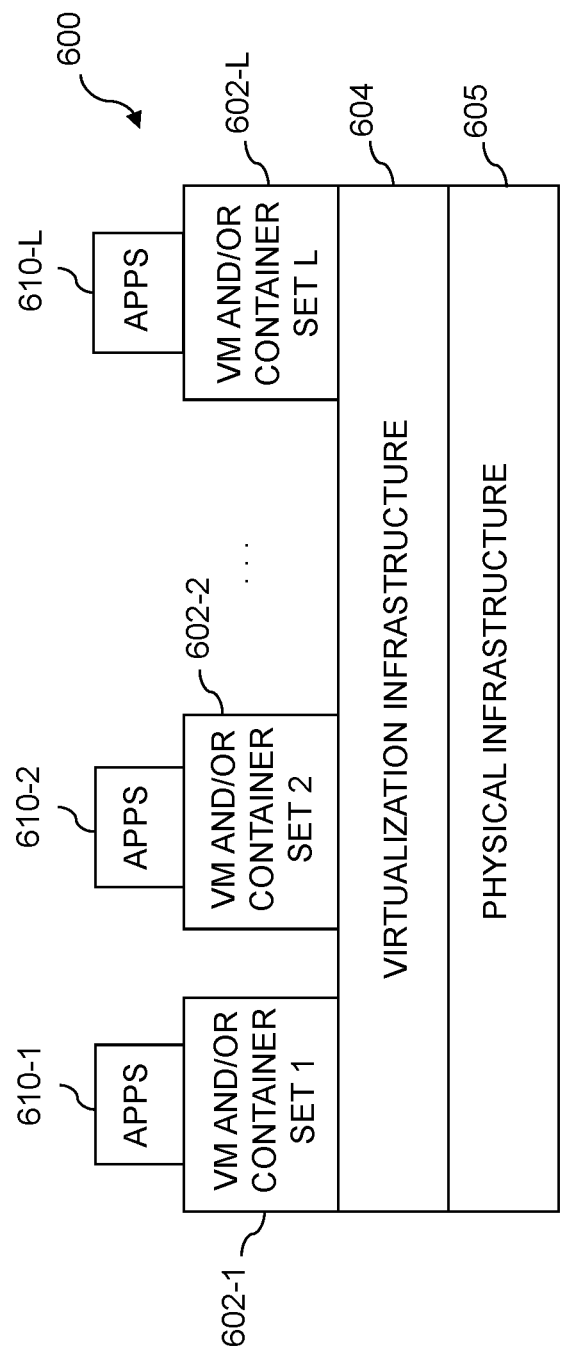
FIGS. 6 and 7 show examples of processing platforms that may be utilized to implement at least a portion of an information processing system in illustrative embodiments.
Figure 7:
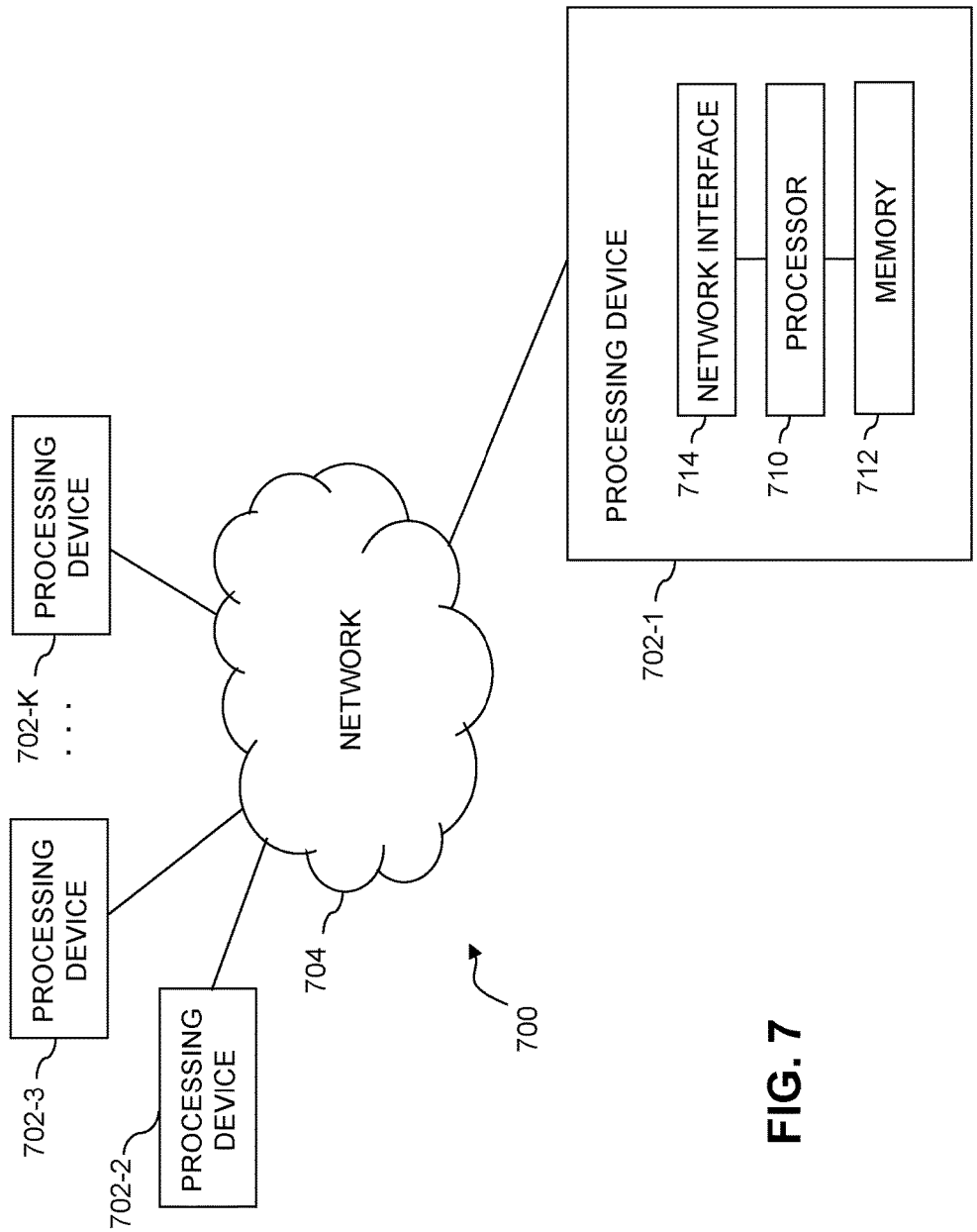

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide storage functionality of the type described above for one or more processes running on a given one of the VMs.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 5 process for utilizing both content-based and address-based mapping between logical addresses and physical addresses.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage controller being configured:
to receive a plurality of logical addresses, each logical address having one of a content-based mapping type and an address-based mapping type;
responsive to a first logical address of the plurality of logical addresses having the content-based mapping type, to utilize a content-based mapping generated based on content of a data page associated with the first logical address to identify a corresponding physical address; and
responsive to a second logical address of the plurality of logical addresses having the address-based mapping type, to utilize an address-based mapping generated based on the second logical address to identify a corresponding physical address;
wherein the storage controller is implemented by at least one processing device comprising a processor coupled to a memory.

2. The apparatus of claim 1 wherein the storage controller is further configured to determine the mapping type of each logical address based at least in part on information contained in a metadata structure associated with the plurality of logical addresses.

3. The apparatus of claim 2 wherein the information contained in the metadata structure comprises a flag corresponding to each logical address, the flag corresponding to a given logical address indicating whether the given logical address has the content-based mapping type or the address-based mapping type.

4. The apparatus of claim 2 wherein the information contained in the metadata structure comprises an entry for each logical address, each entry comprising a hash value associated with the corresponding logical address.

5. The apparatus of claim 4 wherein the hash value for an entry corresponding to a given logical address having the content-based mapping type comprises a content-based signature generated based on content of a data page associated with the given logical address.

6. The apparatus of claim 4 wherein the hash value for an entry corresponding to a given logical address having the address-based mapping type comprises a hash of the given logical address.

7. The apparatus of claim 1 wherein data pages associated with logical addresses having the address-based mapping type are not deduplicated by the storage system.

8. The apparatus of claim 1 wherein the mapping generated based on the second logical address comprises a mapping to a range of physical addresses, the range of physical addresses comprising the physical address corresponding to the second logical address.

9. The apparatus of claim 8 wherein the second logical address comprises a base logical address in a range of logical addresses having the address-based mapping type, the storage controller further configured:
to identify an offset of a given logical address in the range of logical addresses relative to the base logical address;
to utilize the identified physical address corresponding to the second physical address as a base physical address in the range of physical addresses; and
to identify a physical address corresponding to the given logical address from the range of physical addresses using the identified offset as an offset relative to the base physical address.

10. The apparatus of claim 8 wherein the range of physical addresses comprises a redundant array of independent disks (RAID) stripe distributed across the plurality of storage devices.

11. The apparatus of claim 1 wherein the plurality of storage devices are configured to store data corresponding to logical addresses having the address-based mapping type in a first volume and to store data corresponding to logical addresses having the content-based mapping type in a second volume different than the first volume.

12. The apparatus of claim 11 wherein the plurality of storage devices are configured to store data corresponding to logical addresses having the address-based mapping type and data corresponding to logical addresses having the content-based mapping type together in the same volume.

13. A method comprising:
receiving a plurality of logical addresses, each logical address having one of a content-based mapping type and an address-based mapping type;
responsive to a first logical address of the plurality of logical addresses having the content-based mapping type, utilizing a content-based mapping generated based on content of a data page associated with the first logical address to identify a corresponding physical address; and
responsive to a second logical address of the plurality of logical addresses having the address-based mapping type, utilizing an address-based mapping generated based on the second logical address to identify a corresponding physical address;
wherein the method is implemented by at least one processing device comprising a processor coupled to a memory.

14. The method of claim 13 wherein the method further comprises determining the mapping type of each logical address based at least in part on information contained in a metadata structure associated with the plurality of logical addresses.

15. The method of claim 14 wherein the information contained in the metadata structure comprises a flag corresponding to each logical address, the flag corresponding to a given logical address indicating whether the given logical address has the content-based mapping type or the address-based mapping type.

16. The method of claim 14 wherein the information contained in the metadata structure comprises an entry for each logical address, each entry comprising a hash value associated with the corresponding logical address,
wherein the hash value for an entry corresponding to a given logical address having the content-based mapping type comprises a content-based signature generated based on content of a data page associated with the given logical address, and
wherein the hash value for an entry corresponding to a given logical address having the address-based mapping type comprises a hash of the given logical address.

17. The method of claim 13 wherein data pages associated with logical addresses having the address-based mapping type are not deduplicated by the storage system.

18. The method of claim 13 wherein the mapping generated based on the second logical address comprises a mapping to a range of physical addresses, the range of physical addresses comprising the physical address corresponding to the second logical address.

19. The method of claim 18 wherein the second logical address comprises a base logical address in a range of logical addresses having the address-based mapping type, the method further comprising:
   identifying an offset of a given logical address in the range of logical addresses relative to the base logical address;
   utilizing the identified physical address corresponding to the second physical address as a base physical address in the range of physical addresses; and
   identifying a physical address corresponding to the given logical address from the range of physical addresses using the identified offset as an offset relative to the base physical address.

20. A computer program product comprising a non-transitory processor-readable storage medium having stored therein program code of one or more software programs, wherein the program code when executed by at least one processing device causes said at least one processing device:
   to receive a plurality of logical addresses, each logical address having one of a content-based mapping type and an address-based mapping type;
   responsive to a first logical address of the plurality of logical addresses having the content-based mapping type, to utilize a content-based mapping generated based on content of a data page associated with the first logical address to identify a corresponding physical address; and
   responsive to a second logical address of the plurality of logical addresses having the address-based mapping type, to utilize an application-based mapping generated based on the second logical address to identify a corresponding physical address.

* * * * *